United States Patent
Hong et al.

(10) Patent No.: US 8,279,888 B2
(45) Date of Patent: Oct. 2, 2012

(54) APPARATUS AND METHOD FOR UPSTREAM TRANSMISSION OF VARIABLE BIT RATE VOIP TRAFFIC IN HYBRID FIBER COAXIAL NETWORK, AND APPARATUS AND METHOD FOR RESOURCE ALLOCATION

(75) Inventors: Seung-Eun Hong, Daejon (KR); O-Hyung Kwon, Daejon (KR); Soo-In Lee, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 873 days.

(21) Appl. No.: 11/861,672

(22) Filed: Sep. 26, 2007

(65) Prior Publication Data
US 2008/0075108 A1    Mar. 27, 2008

(30) Foreign Application Priority Data
Sep. 27, 2006   (KR) .................. 10-2006-0094394

(51) Int. Cl.
*H04L 12/42* (2006.01)
(52) U.S. Cl. ...................................... 370/449; 710/316
(58) Field of Classification Search .................. 370/449, 370/516, 353, 346; 379/93.31; 725/111
See application file for complete search history.

(56) References Cited

U.S. PATENT DOCUMENTS

| | | | |
|---|---|---|---|
| 6,621,812 B1 * | 9/2003 | Chapman et al. | 370/346 |
| 2005/0031097 A1 * | 2/2005 | Rabenko et al. | 379/93.31 |
| 2007/0091873 A1 * | 4/2007 | LeBlanc et al. | 370/352 |
| 2008/0285599 A1 * | 11/2008 | Johansson et al. | 370/516 |
| 2010/0023988 A1 * | 1/2010 | Gummalla et al. | 725/111 |

FOREIGN PATENT DOCUMENTS

| | | |
|---|---|---|
| KR | 1020060062021 | 6/2006 |
| KR | 1020060062673 | 6/2006 |

* cited by examiner

*Primary Examiner* — Robert Wilson
*Assistant Examiner* — Lionel Preval
(74) *Attorney, Agent, or Firm* — Lowe Hauptman Ham & Berner, LLP

(57) ABSTRACT

Provided are an apparatus and method for upstream transmission of variable bit rate traffic in a Hybrid Fiber Coaxial (HFC) network. The apparatus includes: a VoIP signal processing unit for digitizing a voice of a speaker to create a voice packet, detecting a mute section to suppress packet generation, and generating an Service identification (SID) packet in the mute section; a storage unit for storing the voice packet and the SID packet created by the VoIP signal processing unit and notifying information on the stored packets; a VoIP activity determining unit for determining a voice activity based on the information on the stored packets notified from the storage unit; and a packet processing unit for including the voice activity transferred from the VoIP activity determining unit in the packets from the storage unit to encapsulate them and transmit it to a network device.

13 Claims, 12 Drawing Sheets

FIG. 13

| TYPE | LENGTH | VALUE |
|---|---|---|
| 24.N | 9 | VOICE ACTIVITY LEVEL (1 BYTE): 0 |
| | | UNSOLICITED GRANT BYTE SIZE (2 BYTE): 0 |
| | | VOICE ACTIVITY LEVEL (1BYTE): 1 |
| | | UNSOLICITED GRANT BYTE SIZE (2 BYTE): 78 |
| | | VOICE ACTIVITY LEVEL (1BYTE): 2 |
| | | UNSOLICITED GRANT BYTE SIZE (2 BYTE): 147 |

FIG. 14

| TYPE | LENGTH | VALUE |
|---|---|---|
| 24.N | 12 | VOICE ACTIVITY LEVEL (1 BYTE): 0 |
| | | UNSOLICITED GRANT BYTE SIZE (2 BYTE): 0 |
| | | VOICE ACTIVITY LEVEL (1BYTE): 1 |
| | | UNSOLICITED GRANT BYTE SIZE (2 BYTE): 69 |
| | | VOICE ACTIVITY LEVEL (1BYTE): 2 |
| | | UNSOLICITED GRANT BYTE SIZE (2 BYTE): 77 |
| | | VOICE ACTIVITY LEVEL (1BYTE): 3 |
| | | UNSOLICITED GRANT BYTE SIZE (2 BYTE): 89 |

APPARATUS AND METHOD FOR UPSTREAM TRANSMISSION OF VARIABLE BIT RATE VOIP TRAFFIC IN HYBRID FIBER COAXIAL NETWORK, AND APPARATUS AND METHOD FOR RESOURCE ALLOCATION

CROSS-REFERENCE TO RELATED APPLICATIONS

The present invention claims priority of Korean Patent Application No. 10-2006-0094394, filed on Sep. 27, 2006, which is incorporated herein by reference.

BACKGROUND OF THE INVENTION

1. Field of the Invention

The present invention relates to an apparatus and method for upstream transmission of variable bit rate traffic in a Hybrid Fiber Coaxial (HFC) network, and an apparatus and method for resource allocation; and, more particularly, to an apparatus and method for upstream transmission of variable bit rate traffic in an HFC network, and an apparatus and method for resource allocation, which prevent unnecessary resource allocation due to a Service identification (SID) packets intermittently generated in a mute section and more efficiently allocate resources for various sizes of variable bit rate packets generated in an assonance section, by notifying a network device of an audio activity of Voice over Internet Protocol (VoIP) audio codec detected at a subscriber device side.

This work was partly supported by the Information Technology (IT) research and development program of the Korean Ministry of Information and Communication (MIC) and/or the Korean Institute for Information Technology Advancement (IITA) [2006-S019-01, "The Development of Digital Cable Transmission and Receive System for 1 Gbps Downstream"].

2. Description of Related Art

In general, a variable bit rate Voice over Internet Protocol (VoIP) service refers to a technique that generates no packet in a mute section by using assonance/mute patterns of voice. In order to provide this variable bit rate VoIP service, a Voice Activity Detector (VAD) is built in a codec, or in recent years, a codec that generates constant patterns in a mute section and offers two or more transmission rates in an assonance section is used. The variable bit rate VoIP service used herein includes both types of codecs set forth above.

Meanwhile, a Hybrid Fiber Coaxial (HFC) network serves to connect a broadcasting company and a fiber node via an optical fiber cable, and connect other fiber nodes and subscribers via a coaxial cable. In such an HFC network, a network device manages upstream/downstream transmission resources, and particularly should conform to the dynamic reservation Media Access Control (MAC) protocol in case of upstream transmission from distributed subscriber devices to the network device.

By the way, in case of upstream packet transmission in the variable bit rate VoIP service, since the network device does not directly know the occurrence of traffic from the distributed subscriber devices, it has a difficulty in allocating resources for upstream transmission.

Hereinafter, the configuration of a system for providing a VoIP service in a conventional HFC network will be described with reference to FIG. 1.

FIG. 1 is a diagram showing the configuration of a system for providing a VoIP service in a conventional HFC network.

As shown in FIG. 1, the conventional HFC network includes a network device 110 that plays the role of a central controller in terms of resource management, and distributed subscriber devices 120a, 120b, 120c, and 120d for transmitting/receiving packets under the control of the network device 110.

In this structure, each of the subscriber devices 120a, 120b, 120c, and 120d is provided with a VoIP DSP block 130 for digitalizing and compressing an analog voice incoming from a voice generator, and a transmission queue block 140 for storing packets generated by the VoIP DSP block 130. The voice packets stored in the transmission queue block 140 are then sent to the network device 110 by a method to be described later.

That is, Data over Cable Service Interface Specification (DOCSIS) that is a standard for providing data service in the HFC network that is a wideband wired access network describes Unsolicited Grant Service (UGS) and UGS with Activity Detection (UGS/AD) schemes for VoIP service.

First, the UGS scheme is a scheme in which a subscriber device notifies a network device of resources necessary for transmitting a packektization period value of a VoIP codec and one packet when setting-up a VoIP call so that the network device allocates a resource capable of transmitting a VoIP packet every period and the subscriber device transmits the VoIP packet through the allocated resource.

In the flow that receives the service of this UGS scheme, when transmitting a packet using a given resource, it can contain an extended header called Unsolicited Grant Synchronization Header (UGSH) and transfer, through this, information on the UGS service flow state from the subscriber device to the network device. Further, the subscriber device can request an additional resource-grant to the network device by setting a Queue Indicator (QI) bit to 1.

Meanwhile, the UGS/AD scheme is described in U.S. Pat. No. 6,621,812 issued to Cisco Technology Inc., which is adopted as the standard and effectively employs characteristics of a packet generated from a codec with a built-in VAD as follows.

That is, the network device judges whether or not the subscriber device uses the VAD codec at the time of VoIP call set-up. If the VAD codec is used, the network device first allocates a resource capable of transmitting a packet generated from the VAD codec to the subscriber device whenever packet is generated, and the subscriber device transmits the packet by using the allocated resource.

At this time, when the VAD codec of the subscriber device recognizes mute and generates no packet, the subscriber device does not use the allocated resource. If the network device recognizes this, it suspends the resource allocation. And the network device polls the target subscriber device by periods agreed at the time of call set-up. Here, the polling means a periodic resource allocation for allowing the subscriber device to transmit a small packet, wherein the size of resource to be allocated is very small, compared with the VoIP packet transmission resource.

Meanwhile, when the subscriber device recognizes that there is a packet in a queue with the polling resource being not used in a mute section, the subscriber device notifies the network device that it is transited to an assonance section by using a first polling resource allocated after recognition. Then, the network device suspends the polling and periodically allocates a resource capable of again transmitting the voice packet. At this time, the network device additionally allocates opportunities of transmission once or twice in order to minimize packet transmission delay. This additional resource allocation is to quickly empty a transmission queue of the subscriber device. Although the subscriber device does not use an additional resource allocation, the network device continuously performs a periodic resource allocation.

On the other hand, the DOCSIS standard allows the use of the UGSH extended header, as in UGS/AD or UGS. At this time, a QI bit has the same function as in the USG and an AG field is set to 0 when it is transited from assonance to mute. As for an event of transiting from assonance to mute, in case a timer is operated at an MAC layer and an additional packet is not generated until the timer expires, a transition event can be generated. Further, in case of transiting from mute to assonance, a corresponding event can be generated by recognizing the occurrence of packet.

By the way, the difference is that the subscriber device transmits a resource request message with a polling resource when transiting from mute to assonance and the network device does not consider the size of the resource request message. Namely, the network device resumes the UGS service by receiving the resource request message merely. Further, the number of resources being additionally allocated can be determined by the network device independently or by referring to an AG field value of the UGSH received after resumption of service. The latter case, the subscriber device can specify the resource allocation number currently necessary.

FIG. 2 is a flowchart describing the flow of signals in an example of a packet transmission/reception process of the UGS-AD scheme according to the conventional DOCSIS standard, and particularly is a flowchart describing of the flow of signals in an example of a process for upstream-transmitting a VoIP packet in the conventional USG/AD scheme.

First, the subscriber device 205 and the network device 210 exchange all parameters related to VoIP call through Dynamic Service Addition (DSA) request transmission/reception (215), DSA response transmission/reception (220), and DSA confirmation message exchange (225) for VoIP call set-up. Through the above procedure, the subscriber device 205 sets-up a call by exchanging the period and size of resource allocation of the network device 210 and the period of polling being executed when transiting to mute.

If this call set-up procedure has been finished, the network device 210 allocates UG (203a), and the subscriber device 205 confirming the UG allocation sends a voice packet stored in a transmission queue (235a) to the network device 210 by using the UG (240a), and this process is repeated once again (230b, 235b, and 240b).

Thereafter, the network device 210 continuously allocates UG (230c), and when the subscriber device 205 confirms that its own transmission queue is empty (245a), it does not use UG (250). Then, the network device 210 suspends the UG allocation and polls the subscriber device 205 (260a). And, the subscriber device 205 that has received polling does not use a polling resource since the transmission queue (245b) is empty (265). Then, the network device 210 that has confirmed the unused polling resource again polls the subscriber device (260b) and the subscriber device 205 that has received polling confirms that a voice packet is stored in its own transmission queue (270) and thereafter transmits the resource request message through the polling resource (275).

The network device 210 that has received this resource request message allocates two UGs to the subscriber device 210 (280). Then, the subscriber device 205 transmits the voice packet (270) previously stored and another voice packet (285) that is generated after that and stored in the transmission queue to the network device 210 by using the allocated UG resource (290).

The network device 210 that has received the voice packet from the subscriber device 205 continuously allocates UG (295), and the above-described procedures are repeated.

FIG. 3 is a view illustrating an example of the structure of a voice packet transmitted in a conventional UGS-AD scheme.

As shown in FIG. 3, a voice packet 300 transmitted in the UGS-AD scheme includes a DOCSIS MAC header 305 and voice data 310. Further, although not shown in the drawing, the voice data 310 has the form of being encapsulated in an Ethernet header, an IP header, and an RTP header. And, the DOCSIS MAC header 305 contains a Frame Control (FC) field (where '0x01' is a value denoting a data frame) 315 indicating the type of DOCSIS frames, an Extended Header Length (EHDR LEN) field 320, a LEN (frame length) field 325, an EHDR field 330, and a Header Check Sequence (HCS) field 335.

FIG. 4 is a view illustrating an example of the structure of a resource request message transmitted in a conventional UGS/AD scheme.

As shown in FIG. 4, a resource request message 400 transmitted in the UGS/AD scheme includes contains an FC field (where '0xc4' is a value representing a resource request) 410 representing the type of DOCSIS frames, a request (REQ) field 420 indicating an amount of resource requested, an Service identification (SID) field 430 denoting a subscriber device that transmits a resource request message, and an HCS field 440. The REQ field 420 is a value that is not used in the UGS/AD scheme.

FIG. 5 is a view for explaining packet generation patterns of a codec that intermittently generates packets in a mute section and the problems that may occur when VoIP service is provided in a UGS/AD scheme.

Here, the codec has the function that suppresses the packet generation in a mute section of voice by incorporating a voice activator therein. The packet generated by the codec shows different patterns in assonance and mute sections. That is, in the assonance section, voice packets 520a, 520b and 520c of fixed length are periodically generated at packetization intervals. At this time, the network device allocates resources 525a, 525b, and 525c at predetermined packetization intervals to transmit the voice packets 520a, 520b and 520c. The size of the resource allocation corresponds to a size including a protocol overheader (DOCSIS MAC header, Ethernet header and CRC, IP header, UDP header, and RTP header) and a physical layer overheader of the voice packets.

Further, the codec generates an SID packet 530 carrying background noise information used for improving the voice quality at the start point of an initial packetization interval of the mute section when transiting from the assonance section to the mute section. Here, the SID packet 530 is smaller than that each of the voice packets 520a, 520b and 520c, and the SID packet 555 of the same size is intermittently generated in the mute section.

By the way, the network device cannot recognize the SID packet generated when transiting from the assonance section to the mute section, and thus, it allocates a resource 535 having the same size as the voice packets 525a, 525b and 525c. Then, the subscriber device recognizing the allocation of the resource 535 transmits the SID packet stored in the transmission queue to the network device. At this time, the AG filed value of EHDR is set to 1, like the voice packets 520a, 520b and 520c. And, since the SID packet 530 is very smaller than the voice packet, the unused resource 540 becomes larger than a resource 545 to be actually used.

Further, the network device has received the packet through its own-allocated resource 535, and therefore, it continuously allocates a resource 550. However, since the codec of the subscriber device is already transited to the mute section, it may generate neither the voice packet nor the SID packet. Thus, the resource 550 allocated after transiting to the mute section is not used by the subscriber device, and the subscriber device recognizes the state of the codec to be mute.

Meanwhile, the network device that has recognized that the resource 550 allocated to the subscriber device is not used suspends the resource allocation and starts polling 560 in conformation with the packetization interval of the codec. At this time, when a new SID packet 555 is generated from the codec and already stored in the transmission queue, the subscriber device judges the state of the codec to be transited from mute to assonance based on the SID packet 555, and sends a resource request message to transmit the SID packet 555.

Then, the network device that has received the resource request message through the polling resource 560 recognizes that the codec of the subscriber device is transited from mute to assonance, and resumes a periodic resource allocation 565a. At this time, when transiting from mute to assonance, an additional resource 565b may be allocated and the subscriber device transmits the SID packet 555 by using the allocated resource 565a, wherein a used resource 570 becomes less than an unused resource 575. In addition, the additionally allocated resource 565b is not used because there is no packet to be transmitted. At this time, for the additionally allocated resource 565b, the network device does not recognize the transition to mute although the resource is not used.

Further, as the network device transits from mute to assonance, when the network device accepting the SID packet through the allocated resource 565 receives the SID packet 555 through the resource allocated in the "565" process, it again performs the resource allocation 580 at the start point of a next packetization interval. At this time, since the codec is in the mute state, the video packet as well as the SID packet may not be generated, and thus, the subscriber device does not use the already allocated resource 580 and recognizes the transition from assonance to mute based on the above.

Then, the network device that again recognizes the transition to mute suspends the resource allocation and resumes polling 590. But, the codec may store the voice packet 585a in the transmission queue by transiting from mute to assonance before the polling 590, and thereafter may periodically generate the voice packet 585b. The subscriber device transmits a resource request message for the already generated packet 585a by using the polling 590 and the network device recognizes the transition from mute to assonance from the resource request message received through the polling 590 and resumes the resource allocation. At this time, the network device may allocate an additional resource 595b.

As described above, the conventional method has the problem in that the unnecessary resources 550, 565a, 565b, and 580 are allocated due to the SID packet generated in the mute section.

Hereinafter, the packet generation patterns of a codec that supports the variable bit rate and the problem that may occur when the VoIP service is provided in the UGS/AD scheme will be discussed.

FIG. 6 is a view for explaining packet generation patterns of a codec that supports a variable bit rate and the problem that may occur when a VoIP service is provided in a UGS/AD scheme.

Here, the codec supports a variable bit rate, and particularly supports three transmission rates with different packet sizes in generating packets at predetermined packetization intervals. That is, in the following description, the codec, which is a codec known as EVRC, supports a transmission rate of 1 605a and 605b, a transmission rate of ½ 610, and a transmission rate ⅛ 615. Here, the transmission rates of 1 605a and 605b and the transmission rate of ½ 610 are the ones that support packets generated in the assonance section, and the transmission rate of ⅛ 615 is the one that supports packets generated in the mute section. Differently from the codec described referring to FIG. 5 above, this codec generates a predetermined size of packets at predetermined packetization intervals in the mute section and supports two transmission rates in the assonance section.

That is to say, in the codec that supports the variable bit rate, voice packets with three fixed lengths are generated at the packetization intervals and then transmitted at the three transmission rates. First, voice packets 625a and 625b with the longest length are periodically generated in the transmission rate of 1 section 605a. To service this in the conventional UGS/AD scheme, resources 630a/b, 640a/b/c, 660a/b/c, and 680a/b that can accept the voice packets 625a and 625b generated at the transmission rate of 1 should be periodically allocated. Namely, in the example shown in FIG. 6, voice packets 635a/b/c can be transmitted at predetermined packetization intervals after transiting from the transmission rate of 1 to the transmission rate of ½.

By the way, in the conventional UGS/AD scheme, there is no method capable of notifying that the codec is transited from the transmission rate of 1 605a to the transmission rate of ½ 610. In addition, since the network device can allocate only a predetermined size of sources in the assonance section, it allocates resources 640a/b/c with the same size as the transmission rate of 1 605a.

However, the subscriber device uses parts 650a/b/c of the allocated resources 640a/b/c and wastes remaining resources 645a/b/c. This waste becomes even larger when the transmission rate of ½ section 610 ends and then the transmission rate ⅛ section 615 starts. That is, voice packets 655a/b/c with a minimum size are periodically generated in the transmission rate of ⅛ section 615. At this time, the network device will allocate resources with the same size as the resources 660a/b/c allocated in the transmission rate of 1 section, and the subscriber device uses only parts 660a/b/c of the allocated resources 670a/b/c and wastes remaining resources 665a/b/c. Like this, in case of the codec that supports the variable bit rate provides service in the UGS/AD scheme, since it periodically allocates a fixed size of resources, the resource waste becomes serious as a generation rate thereof becomes small.

The UGS of the standard technique as set forth above does not reflect the mute suppression technique of the codec, and thus is inefficient in terms of resource use. In addition, the conventional UGS/AD technique assumes that the codec with a built-in VAD generates no packets in the mute section. However, all codecs actually generate packets even in the mute section. Especially, packets generated in the mute section are small in size, unlike VoIP data packets, and a generation period thereof may not also be constant.

Due to the above, polling and resource allocation are alternately repeated when using the UGS/AD technique, and resources are wasted in that process. Further, in case the network device allocates additional resources independently around when the assonance section resumes, the SID packet generation of the subscriber device may cause unnecessary resource allocation.

Moreover, the conventional UGS and UGS/AD technique supports only a single transmission rate in the assonance section, and thus cannot effectively support a speech codec that supports the variable bit rate like EVRC. Namely, since the conventional UGS and UGS/AD technique has to set parameters to support the highest transmission rate, resource waste becomes serious in sections where packets are generated at lower transmission rates.

SUMMARY OF THE INVENTION

It is, therefore, an object of the present invention to provide an apparatus and method for upstream transmission of variable bit rate traffic in a hybrid fiber coaxial network, and an apparatus and method for resource allocation, which prevent unnecessary resource allocation due to Service identification (SID) packets intermittently generated in a mute section and more efficiently allocate resources for various sizes of variable bit rate packets generated in an assonance section, by notifying a network device of a voice activity of Voice over Internet Protocol (VoIP) speech codec detected at a subscriber device side.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an aspect of the present invention, there is provided an apparatus for upstream transmission of variable bit rate Voice over Internet Protocol (VoIP) traffic in a Hybrid Fiber Coaxial (HFC) network, including: a VoIP signal processing unit for digitizing a voice of a speaker to create a voice packet, detecting a mute section to suppress packet generation, and generating an Service identification (SID) packet in the mute section; a storage unit for storing the voice packet and the SID packet created by the VoIP signal processing unit and notifying information on the stored packets; a VoIP activity determining unit for determining a voice activity based on the information on the stored packets notified from the storage unit; and a packet processing unit for including the voice activity transferred from the VoIP activity determining unit in the packets from the storage unit to encapsulate them and transmit it to a network device.

In accordance with another aspect of the present invention, there is provided an apparatus for resource allocation of variable bit rate VoIP traffic in an HFC network, including: a resource allocation unit for allocating a resource for voice packet transmission while driving a timer for periodic resource allocation of a subscriber device when a call connection set-up between a network device and the subscriber device is finished; a voice activity extracting unit for extracting a voice activity field value contained in a packet transmitted from the subscriber device; and a control unit for controlling the resource allocation unit to allocate a resource with a suitable size for the voice packet generated by the subscriber device depending on the voice activity value extracted from the voice activity extracting unit.

In accordance with another aspect of the present invention, there is provided a method for upstream transmission of variable bit rate Voice over Internet Protocol (VoIP) traffic in an a Hybrid Fiber Coaxial (HFC) network, including the steps of: a) performing a VoIP call connection procedure by exchanging messages containing VoIP call related parameters between a subscriber device and a network device; b) at the subscriber device, determining a voice activity based on the state of packets stored in a transmission queue of the subscriber unit; and c) at the subscriber device, including the determined voice activity in the voice packets stored in the transmission queue when the subscriber device gets allocated resource from the network device for voice packet transmission, encapsulating them and transmitting the same to the network device, to thereby allow the network device to allocate a resource with a suitable size depending on the voice activity.

In accordance with another aspect of the present invention, there is provided a method for resource allocation of variable bit rate VoIP traffic in an HFC network, including the steps of: a) executing a call connection procedure by exchanging messages containing VoIP call related parameters between a subscriber device and a network device; b) at the network device, allocating a resource for voice packet transmission of the subscriber device; c) extracting a voice activity field value contained in a packet transmitted from the subscriber device; and d) allocating a resource with a suitable size for the voice packet generated by the subscriber device depending on the extracted voice activity value.

BRIEF DESCRIPTION OF THE DRAWINGS

FIGS. 13 and 14 are views illustrating an example of the structure of messages being exchanged for VoIP call set-up between the subscriber device and the network device provided with the apparatus for upstream transmission and the apparatus for resource allocation of variable bit rate VoIP traffic in an HFC network in accordance with an embodiment of the present invention.

DESCRIPTION OF SPECIFIC EMBODIMENTS

The advantages, features and aspects of the invention will become apparent from the following description of the embodiments with reference to the accompanying drawings, which is set forth hereinafter. Thus, the present invention will be easily carried out by those skilled in the art. Further, in the following description, well-known arts will not be described in detail when it seems that they could obscure the invention in unnecessary detail. Hereinafter, preferred embodiments of the present invention will be set forth in detail with reference to the accompanying drawings.

Figure 7:
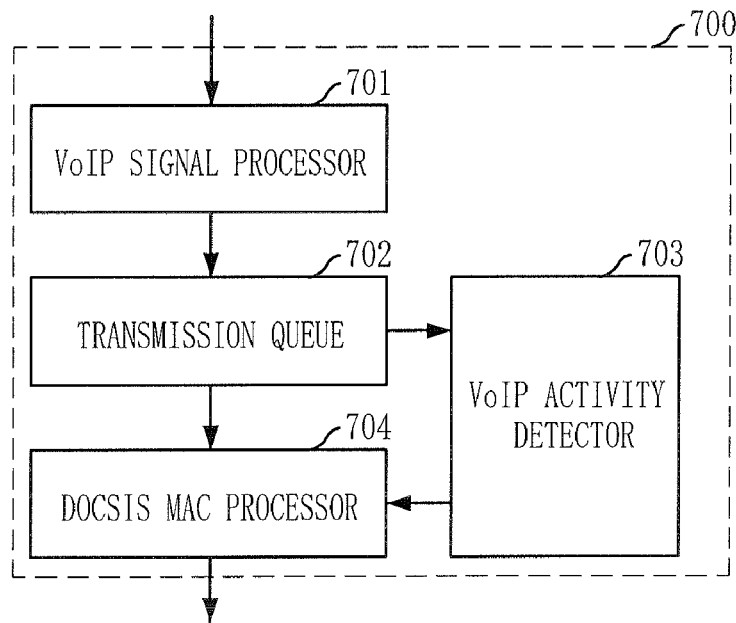
FIG. 7 is a block diagram illustrating the configuration of an apparatus for upstream transmission of variable bit rate VoIP traffic in an HFC network in accordance with an embodiment of the present invention.

FIG. 7 is a block diagram illustrating the configuration of an apparatus for upstream transmission of variable bit rate VoIP traffic in an HFC network in accordance with an embodiment of the present invention. The apparatus 700 for upstream transmission of variable bit rate VoIP traffic can be provided in a subscriber device.

As shown in FIG. 7, the inventive apparatus 700 for upstream transmission of variable bit rate VoIP traffic includes a VoIP signal processor 701, a transmission queue 702, a VoIP activity detector 703, and a DOCSIS MAC processor 704.

The VoIP signal processor 701 performs the functions of digitizing a voice of a speaker to create a voice packet, detecting a mute section to suppress packet generation, and generating an SID packet to packetize background noises in the mute section. In addition, the VoIP signal processor 701 functions to support different packet transmission rates in an assonance section. The voice packet and the SID packet generated by the VoIP signal processor 701 are stored in the transmission queue 702.

The transmission queue 702 stores the voice packet and the SID packet provided from the VoIP signal processor 701 and notifies the VoIP activity detector 703 of information on the stored packets.

Figure 1:
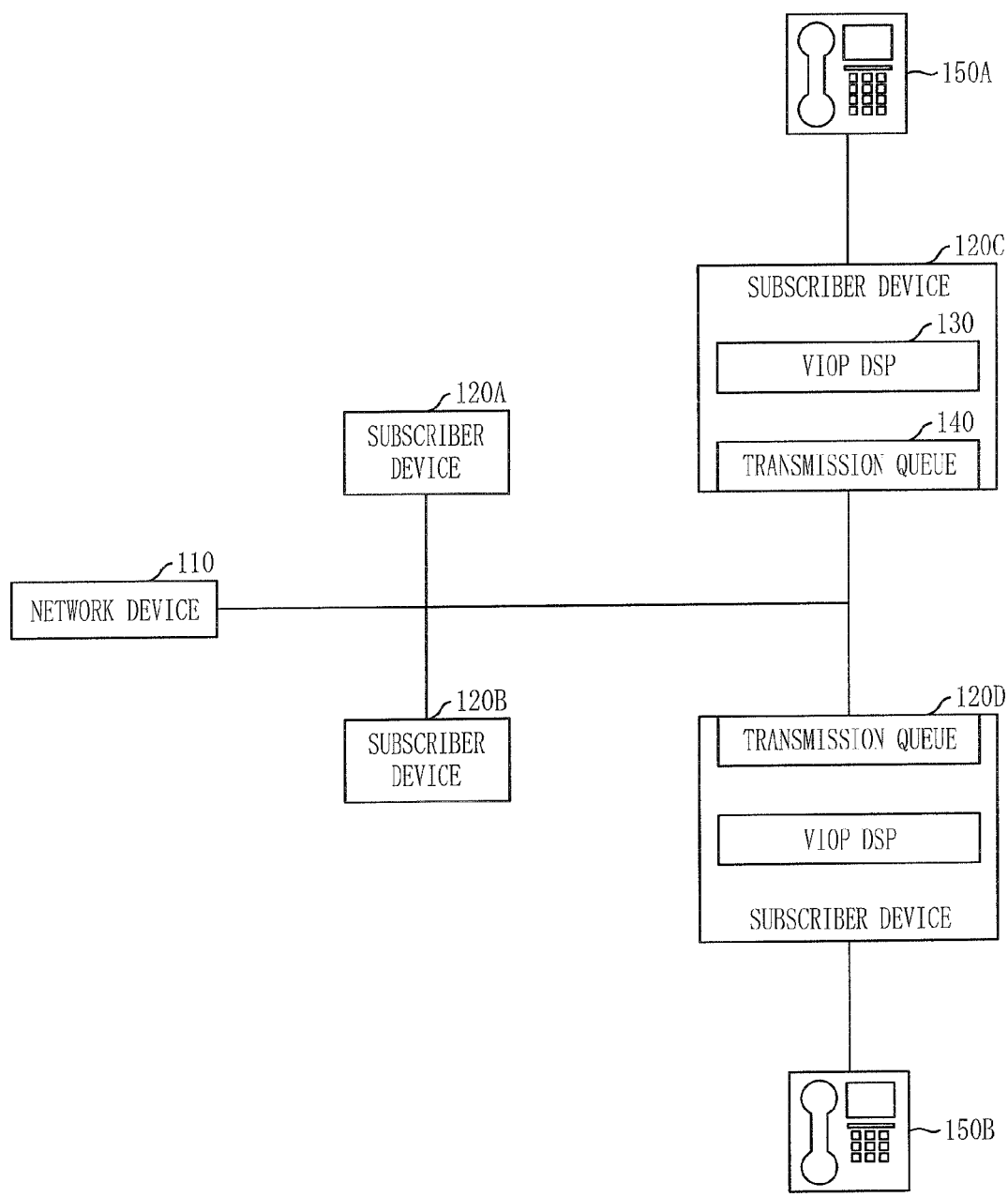
FIG. 1 is a diagram showing an example of the configuration of a system for providing a Voice over Internet Protocol (VoIP) service in a conventional Hybrid Fiber Coaxial (HFC) network.
Figure 2:
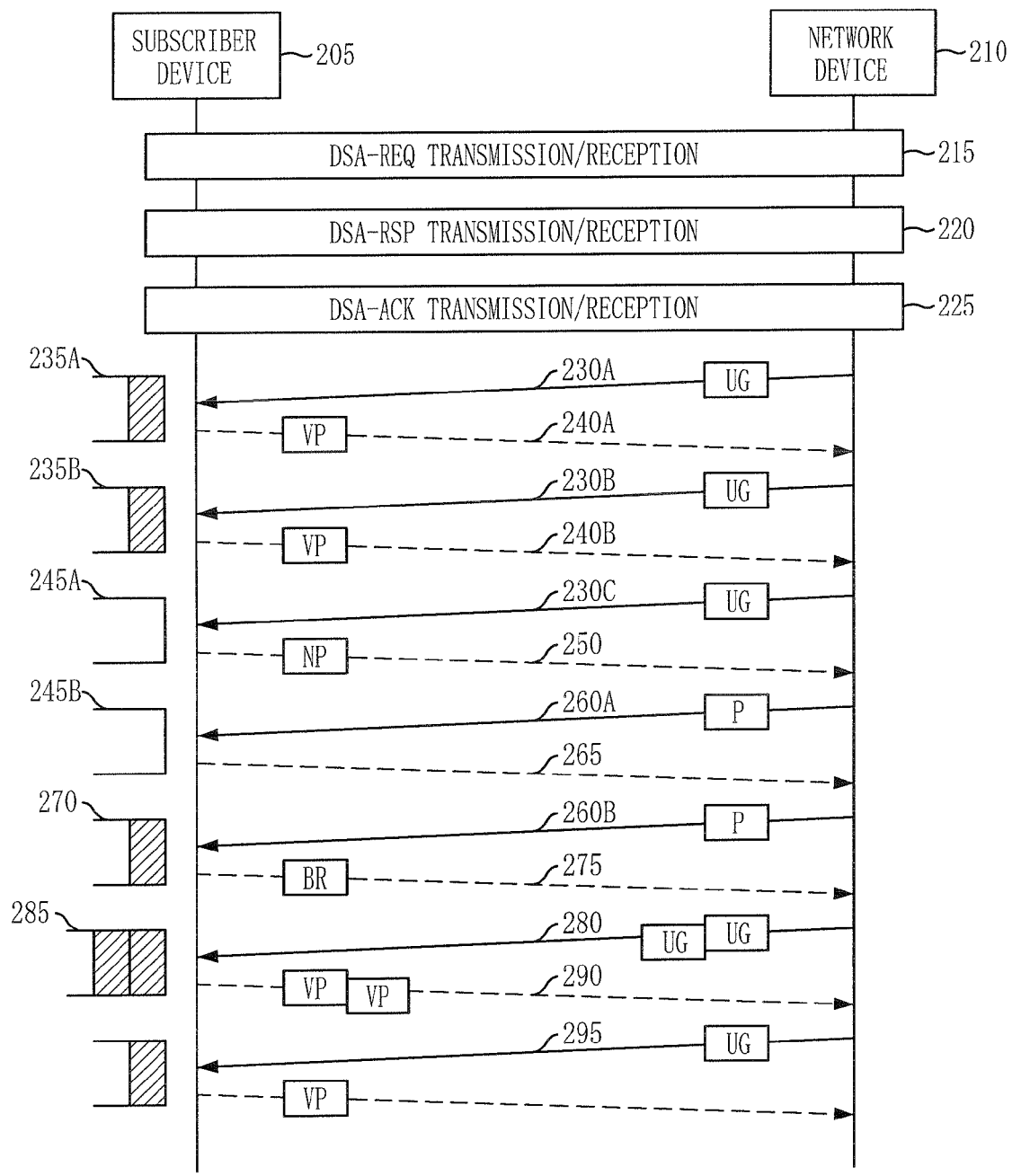
FIG. 2 is a flowchart describing signals in an example of a packet transmission/reception process of a Unsolicited Grant Service with Activity Detection (UGS/AD) scheme according to a conventional DOCSIS standard.
Figure 3:
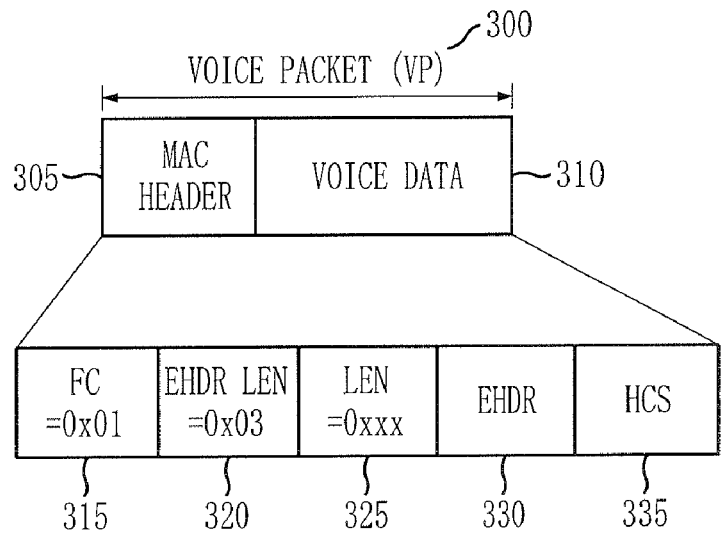
FIG. 3 is a view illustrating an example of the structure of a voice packet transmitted in the conventional UGS/AD scheme.
Figure 4:
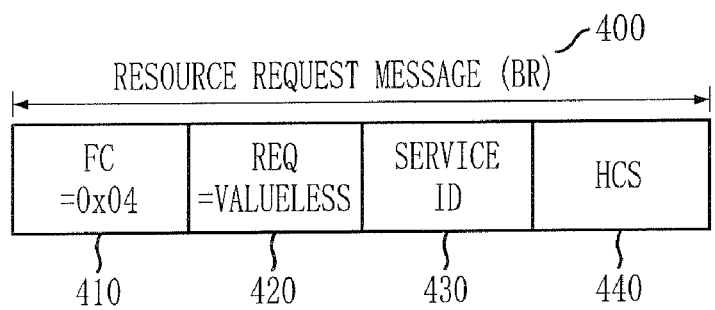
FIG. 4 is a view illustrating an example of the structure of a resource request message transmitted in the conventional UGS/AD scheme.
Figure 5:
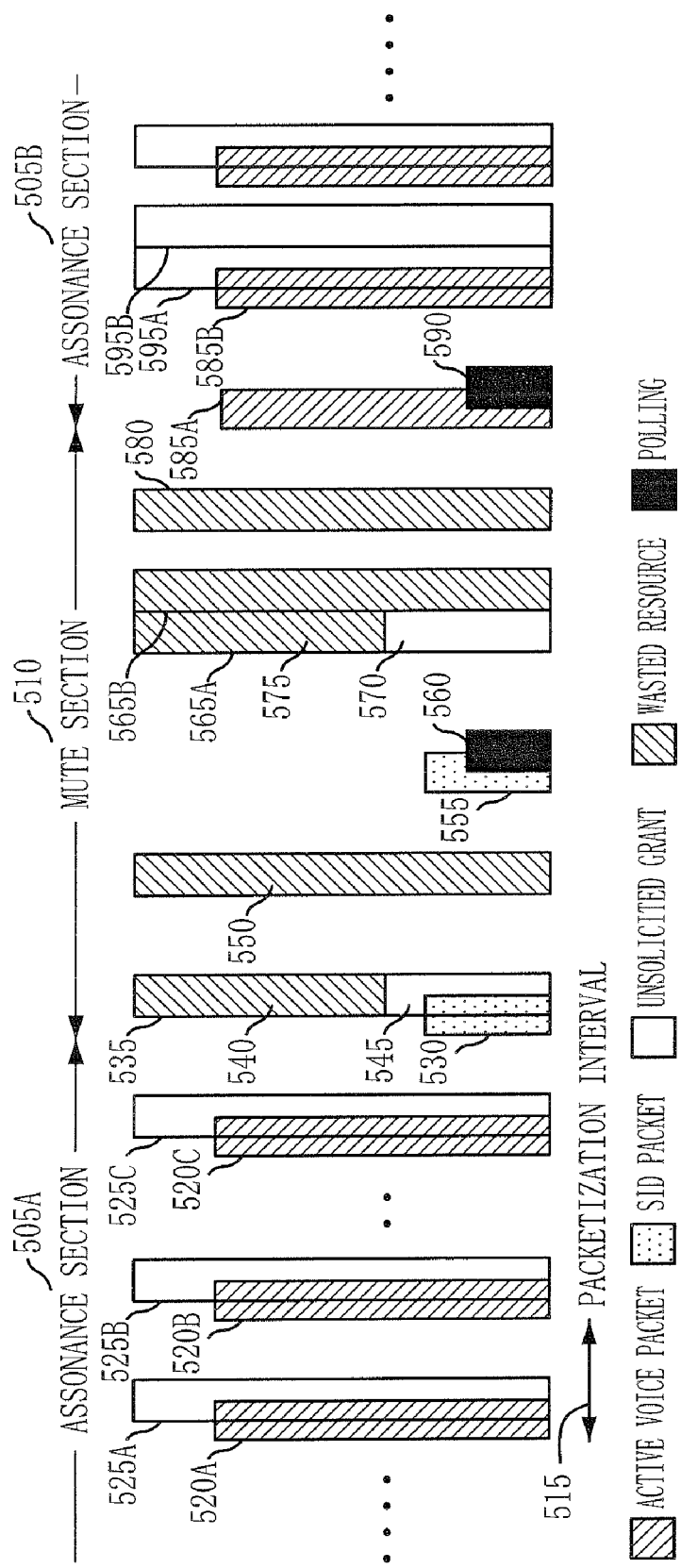
FIG. 5 is a view for explaining packet generation patterns of a codec that intermittently generates packet in the mute section and a problem that may occur when VoIP service is provided in a UGS/AD scheme.
Figure 6:
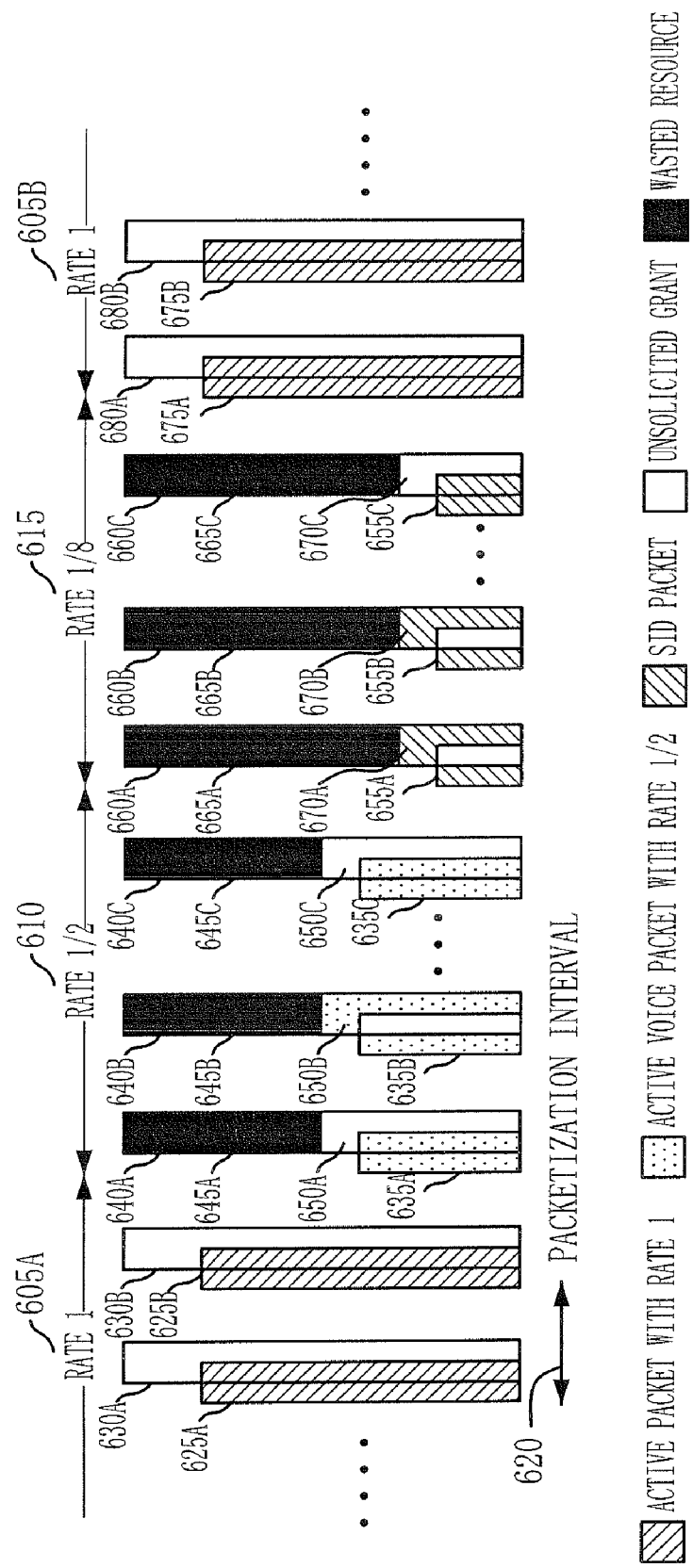
FIG. 6 is a view for explaining packet generation patterns of a codec that supports a variable bit rate and the problem that may occur when VoIP service is provided in the UGS/AD scheme.

The VoIP activity detector 703 receives information on the packets currently stored in the transmission queue 702, that is, packet size information, from the transmission queue 702, determines a voice activity therefor, and transfers it to the DOCSIS MAC processor 704. For example, in the codec showing the packet generation patterns as shown in FIG. 5, when the voice activity is in the assonance state (where a voice activity field value is 2), when the voice packet is stored, the voice activity is continuously maintained, and when the SID packet is stored, the voice activity is transited to mute (where the activity field value is 0). In another example, in the codec showing the packet generation patterns as shown in FIG. 6, when the voice packet is stored, the voice activity may be discriminated depending on the size of each packet.

Meanwhile, when the DOCSIS MAC processor 704 accepts the voice activity from the VoIP activity detector 703, it receives packets from the transmission queue 702, inserts voice activity information thereinto while encapsulating the packets into the DOCSIS header, and transmits the same to the network device.

For example, the codec showing the packet generation patterns as depicted in FIG. 5 transmits an SID packet with the voice activity set to mute when the SID packet is generated in the assonance state, suspends a next resource allocation, and performs polling, thereby utilizing resources more efficiently.

In addition, when SID packets are intermittently generated in the mute state, the codec requests resources necessary for SID packet transmission through the polling resource, and notifies, when the requested resource are allocated and received, the network device of the mute state along with the SID packet, to thereby continue polling.

As mentioned above, the inventive apparatus 700 for upstream transmission of variable bit rate VoIP traffic incorporates therein a voice activator, or identifies the state of packet variably generated by the subscriber device provided with the variable bit rate VoIP codec as VoIP activity, and transmits it to the network device, thus allowing the network device to efficiently perform resource allocation according to the state of packets. Namely, in order to transmit packets intermittently generated in the mute section, or notify the transition from lower transmission rate to a higher transmission rate, the inventive apparatus 700 for upstream transmission of variable bit rate VoIP traffic transmits a resource request message indicating the VoIP activity to the network device. And, the network device allocates a resource with a size suitable for the voice packets generated by the subscriber device based on the VoIP activity contained in the resource request message.

Figure 8:
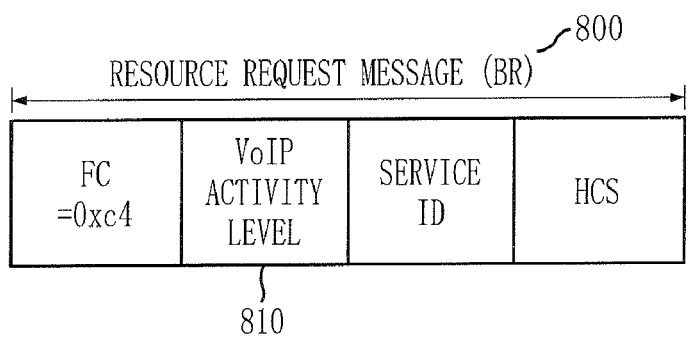
FIG. 8 is a view showing an example of the structure of the resource request message used in the present invention.

FIG. 8 is a view showing an example of the structure of the resource request message used in the present invention. In particular, FIG. 8 shows the structure of the resource request message used when requesting a resource to the network device in order for the subscriber device to transmit the packets stored in the transmission queue 702 by using the polling resource from the network device, or when requesting an addition resource since the size of resource from the network device is less than that of packets stored in the transmission queue 702.

As shown in FIG. 8, the resource request message 800 used in the present invention allows the subscriber device to request various types of resources by changing the REQ field of the existing resource request message to a voice activity field 810 and by using that field value.

For example, when the voice packet is generated in the patterns as shown in FIG. 5, the voice activity field 810 value is set to 1 and transmitted in order to request a resource for the SID packet through the polling resource in the mute section. Further, the voice activity field 810 value is set to 2 and transmitted in order to request a resource for the voice packet through the polling resource when transiting from the mute section to the assonance section.

In another example, when the voice packet is generated in the patterns as shown in FIG. 6, when the transmission rate ⅛ is transited to the transmission rate 1, the voice activity field 810 value of the resource request message is set to 3 and transmitted by using the allocated resource of the transmission rate ⅛.

Figure 9:
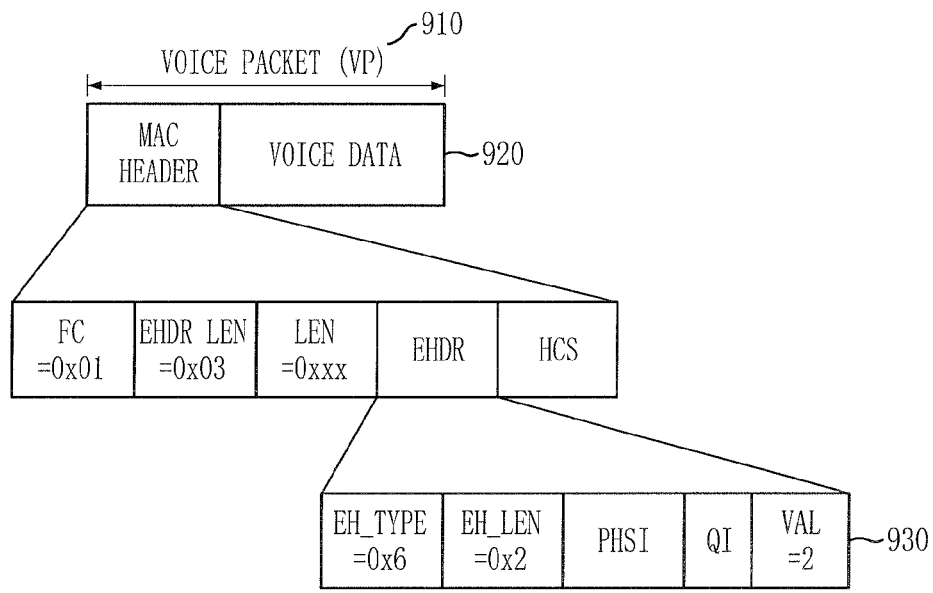
FIGS. 9 and 10 are views showing an example of the structure of a VoIP packet used in the present invention.
Figure 10:
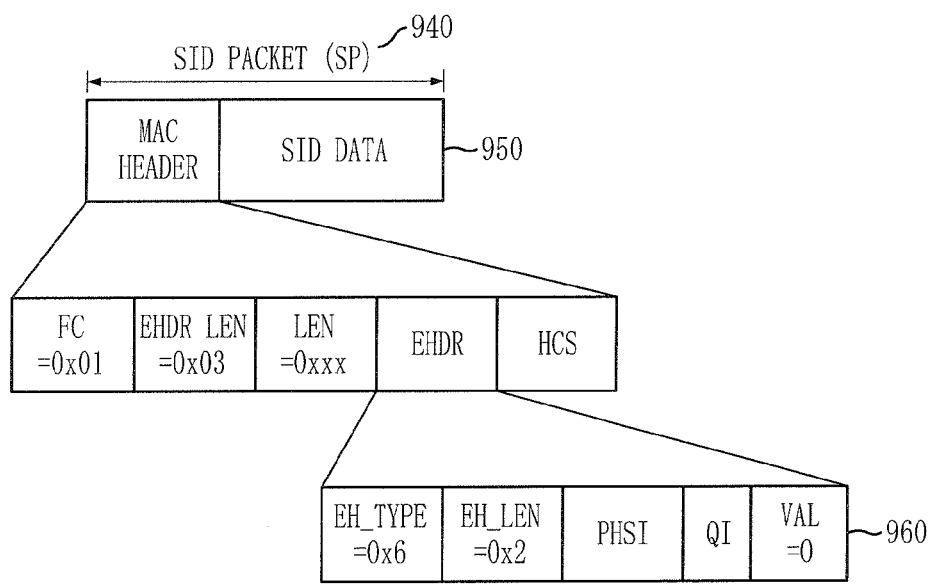

FIGS. 9 and 10 are views showing an example of the structure of VoIP packet used in the present invention. FIG. 9 shows the structure of a voice packet 910 having voice data 920 as its payload, and FIG. 10 shows the structure of an SID packet 940 having SID data 950 generated in the mute section as its payload.

Here, the voice packet 910 and the SID packet 940 contain voice activity fields 930 and 960, respectively. This can be implemented by changing the extended header AG field of the existing VoIP packet to the voice activity fields 930 and 960.

For example, when the voice packet is generated in the patterns depicted in FIG. 5, the voice activity field 930 value is always set to 2 indicative of the assonance section upon transmission of the voice packet, thereby allowing the network device to recognize that it is in the assonance state. On the other hand, as for the SID packet 940 generated in the mute section, the voice activity field 960 is always set to 0, thereby allowing the network device to recognize that it is in the mute state.

By the way, there are two cases in the SID packet 940 of the example shown in FIG. 5 as follows. The first case is that the SID data generated when transiting from assonance to mute is transmitted, and the second case is that the SID data intermittently generated in the mute section is transmitted. These two cases all require temporal and single resource allocation, and the subscriber device generally transmits the packet after setting the voice activity field 960 value to 0. The network device that accepts the SID packet allocates a resource to temporally and singly transmit the SID packet and thereafter periodically polls the subscriber device.

In another example, when the voice packet is generated in the patterns shown in FIG. 6, the subscriber device can request the allocation of resource with a size (generally, a small size) different from the prior art by certain periods by setting the voice activity field 930 value of the voice packet 910. This is allowed for a case where the voice packet to be transmitted is smaller than the allocated resource. In opposite case, the resource request message 800 should be transmitted through the allocated resource. Thus, resources with other transmission rates can be allocated only when the resource request message is transmitted during transmission of SID packets with the transmission rate ⅛.

Figure 11:
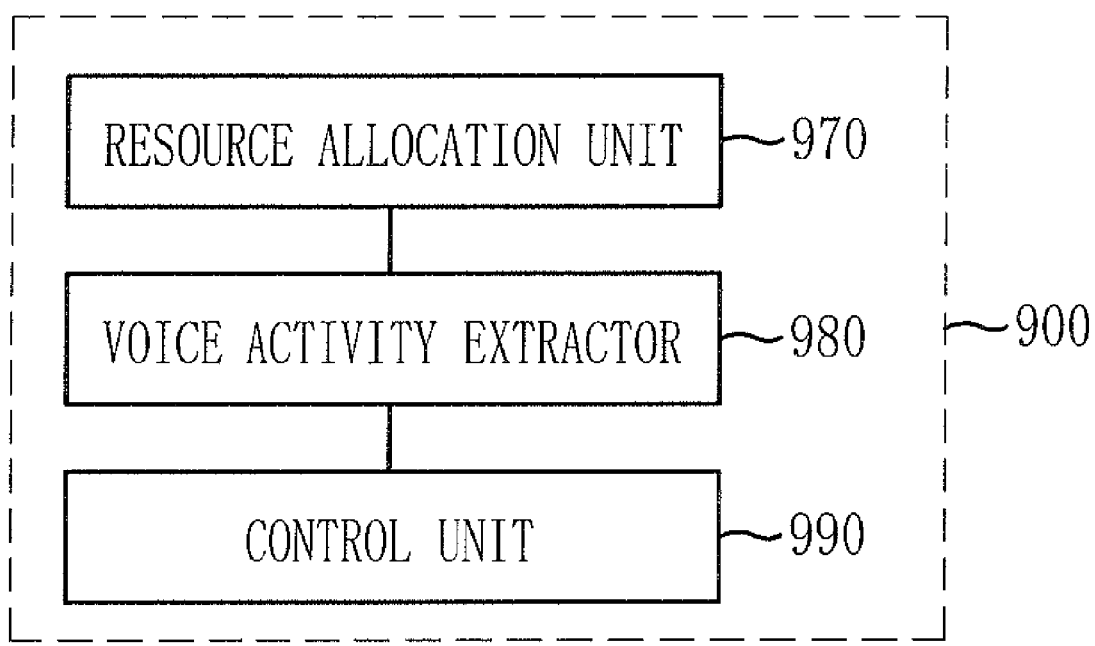
FIG. 11 is a block diagram illustrating the configuration of an apparatus for resource allocation of variable bit rate VoIP traffic in an HFC network in accordance with an embodiment of the present invention.

FIG. 11 is a block diagram illustrating the configuration of an apparatus for resource allocation of variable bit rate VoIP traffic in an HFC network in accordance with an embodiment of the present invention. In FIG. 11, the apparatus 900 for resource allocation of variable bit rate VoIP traffic in an HFC network can be provided in the network device.

As shown in FIG. 11, the inventive apparatus 900 for resource allocation of variable bit rate VoIP traffic in an HFC network includes a resource allocation unit 970, a voice activity extractor 980, and a control unit 990.

The resource allocation unit 970 drives a timer for periodic resource allocation of the subscriber device when a call connection set-up with the subscriber device is completed, and allocates a resource for voice packet transmission.

The voice activity extractor 980 extracts the voice activity field value contained in the packet transmitted from the subscriber device.

The control unit 990 controls the resource allocation unit 970 to allocate a resource with a size suitable for the video packet generated by the subscriber device depending on the video activity value extracted from the video activity extractor 980. Details thereof will be described later with reference to FIG. 15.

Figure 12:
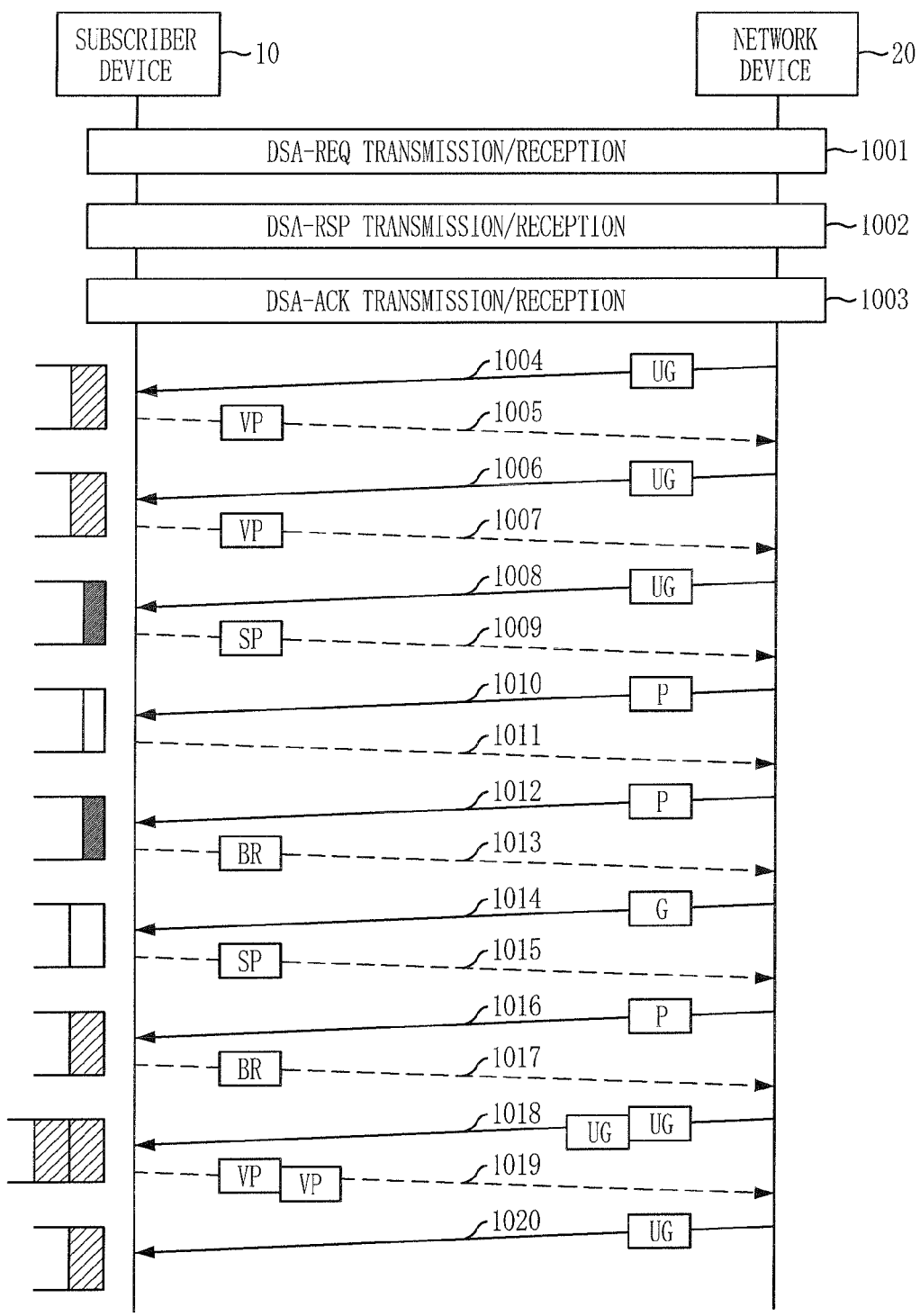
FIG. 12 is a flowchart describing a method for upstream transmission and a method for resource allocation of variable bit rate VoIP traffic in an HFC network in accordance with an embodiment of the present invention.

The following is an explanation for an overall operation process of the present invention with reference to FIG. 12.

FIG. 12 is a flowchart describing a method for upstream transmission and a method for resource allocation of variable bit rate VoIP traffic in an HFC network in accordance with an embodiment of the present invention. Specifically, FIG. 12 shows a procedure of messages being exchanged between the subscriber device and the network device using the codec exhibiting the packet generation patterns as in FIG. 5.

First of all, the subscriber device 10 and the network device 20 execute a VoIP call connection procedure by exchanging messages containing VoIP call related parameters as shown in FIGS. 13 and 14 (1001, 1002 and 1003). FIGS. 13 and 14 are views illustrating an example of the structure of messages being exchanged for VoIP call set-up between the subscriber device and the network device provided with the apparatus for upstream transmission and the apparatus for resource allocation of variable bit rate VoIP traffic in accordance with an embodiment of the present invention, and particularly show the video activity according to the type of a speech codec and information on its resource allocation size.

More specifically, the parameters shown in FIG. 13 are applied to the speech codec, e.g., G.711, with an activity detector of the subscriber device, and are the ones contained in DSA-REQ/RSP/ACK message being exchanged for setting up VBR VoIP call between the subscriber device and the network device. The parameters shown in FIG. 13 are coded in the form of Type-Length-Value (TLV) and contained in the DSA-REQ/RSP/ACK message.

As depicted in FIG. 13, the DSA-REQ/RSP/ACK message being exchanged for setting up VBR VoIP call between the subscriber device and the network device provided with the codec with the activity extractor contains a type field, a length field, and a value field. The type field can use an arbitrary value, e.g., indicated by N, not previously used as existing lower TLV with 24. The length field denotes the length of data stored in the value field. And written in the value field are a voice activity level of 1 byte and three pairs of unsolicited grant byte sizes corresponding to the voice activity.

For example, the G.711 codec with the activity detector does not allocate a resource but performs polling when the voice activity is 0, sets the SID packet length to the unsolicited grant byte size when the voice activity is 1, and constitutes pair of information with the voice packet length generated as the unsolicited grant byte size when the voice activity is 2.

Meanwhile, in the variable bit rate VoIP codec, the parameters shown in FIG. 14 are contained in the DSA-REQ/RSP/ACK message being exchanged for setting-up VBR VoIP call between the subscriber and the network device.

That is, as shown in FIG. 14, the DSA-REQ/RSP/ACK message being exchanged for setting-up VBR VoIP call between the subscriber and the network device provided with the codec with variable bit rate VoIP codec contains a type field, a length field, and a value field. The type field can use an arbitrary value, e.g., indicated by N, not previously used as existing lower TLV with 24. The length field denotes the length of data stored in the value field. And written in the value field are a voice activity level of 1 byte and four pairs of unsolicited grant byte sizes corresponding to the voice activity.

For example, the EVRC codec does not allocate resource but performs polling when the voice activity is 0, sets the voice packet generated at the transmission rate ⅛ to the unsolicited grant byte size when the voice activity is 1, sets the voice packet length generated at the transmission rate ½ to the unsolicited grant byte size when the voice activity is 2, and sets the voice packet length generated at the transmission rate 1 to as the unsolicited grant byte size when the voice activity is 3.

Meanwhile, when the call set-up has been completed by the VoIP call connection procedure, the voice packet is stored in the transmission queue of the subscriber device 10, and the network device 20 allocates a resource capable of transmitting the voice packet in conformation with a transmission queue storage time (1004). Then, the subscriber device 10 transmits the voice packet to the CMTS by using the allocated resource. At this time, the voice activity value is set to 2, which indicates the assonance state. The above procedure is repeated when another voice packet is stored in the transmission queue of the subscriber device 10 (1006 and 1007).

Thereafter, when the VoIP signal processor 701 of the subscriber device 10 detects that the voice activity is transited from 2 indicating the assonance state to 0 indicating the mute state, it generates the SID packet and stores it in the transmission queue 702. The CMTS that does not know the transition to the mute state allocates the same resource as the voice packet (1008), and the subscriber device 10 transmits the SID packet by using the allocated resource (1009). At this time, the SID packet indicates that the voice activity is in the mute state.

Then, the CTMS that has received the SID packet from the subscriber device 10 recognizes that the VoIP activity of the subscriber device 10 is transited to mute, suspends the resource allocation for the voice packet, and starts polling of the subscriber device 10 (1010). At this time, the VoIP signal processor 701 of the subscriber device 10 suppresses packet generation in the mute section, and thus the transmission queue becomes empty. Therefore, the subscriber device 10 does not use the allocated polling resource transmitted from the network device 20 (1011).

Meanwhile, the network device 20 polls the subscriber device 10 (1012), and when the SID packet generated by the VoIP signal processor 701 of the subscriber device 10 is stored in the transmission queue 702, the subscriber device 10 transmits the resource request message by using the polling resource (1013). At this time, the subscriber device 10 indicates the voice activity as 1 denoting the mute state and transmits it.

Then, the network device 20 that has received the resource request message allocates a resource that considers the SID packet length agreed in the call sep-up procedure (1001, 1002 and 1003) since the voice activity value contained in the resource request message is 1 indicating the mute state (SID packet) (1014). And the subscriber device 10 transmits the SID packet by using the allocated resource.

On the other hand, the network device 20 that accepts the SID packet from the subscriber device 10 starts polling to the subscriber device depending on the check result of the voice activity of the received SID packet (1016). If the VoIP 701 of the subscriber device 10 is transited to the assonance state and thus the voice packet is stored in the transmission queue 702, the subscriber device 10 transmits the resource request message to send the voice packet stored in the transmission queue 702 by using the polling resource (1017). At this time, the voice activity is indicated as 2 that is the assonance state.

Meanwhile, the network device 20 that has received the resource request message from the subscriber device 10 checks the voice activity of the resource request message and resumes a periodic resource allocation for the voice packet when the voice activity is 2 that is the assonance state (1018). Here, in the initial resource allocation after transiting from the mute section to the assonance section, two or more resources of designated sizes may be allocated.

Next, when two voice packets are stored in the transmission queue 702 of the subscriber device 10, the subscriber device transmits the voice packets stored in the transmission queue to the network device 20 702 by using the allocated resource (1019). And then, the network device 20 performs a periodic resource allocation (1020). Hereinafter, a more detailed operation process of the network device 20 and the subscriber device 10 will be described with reference to FIGS. 15 and 16.

Figure 15:
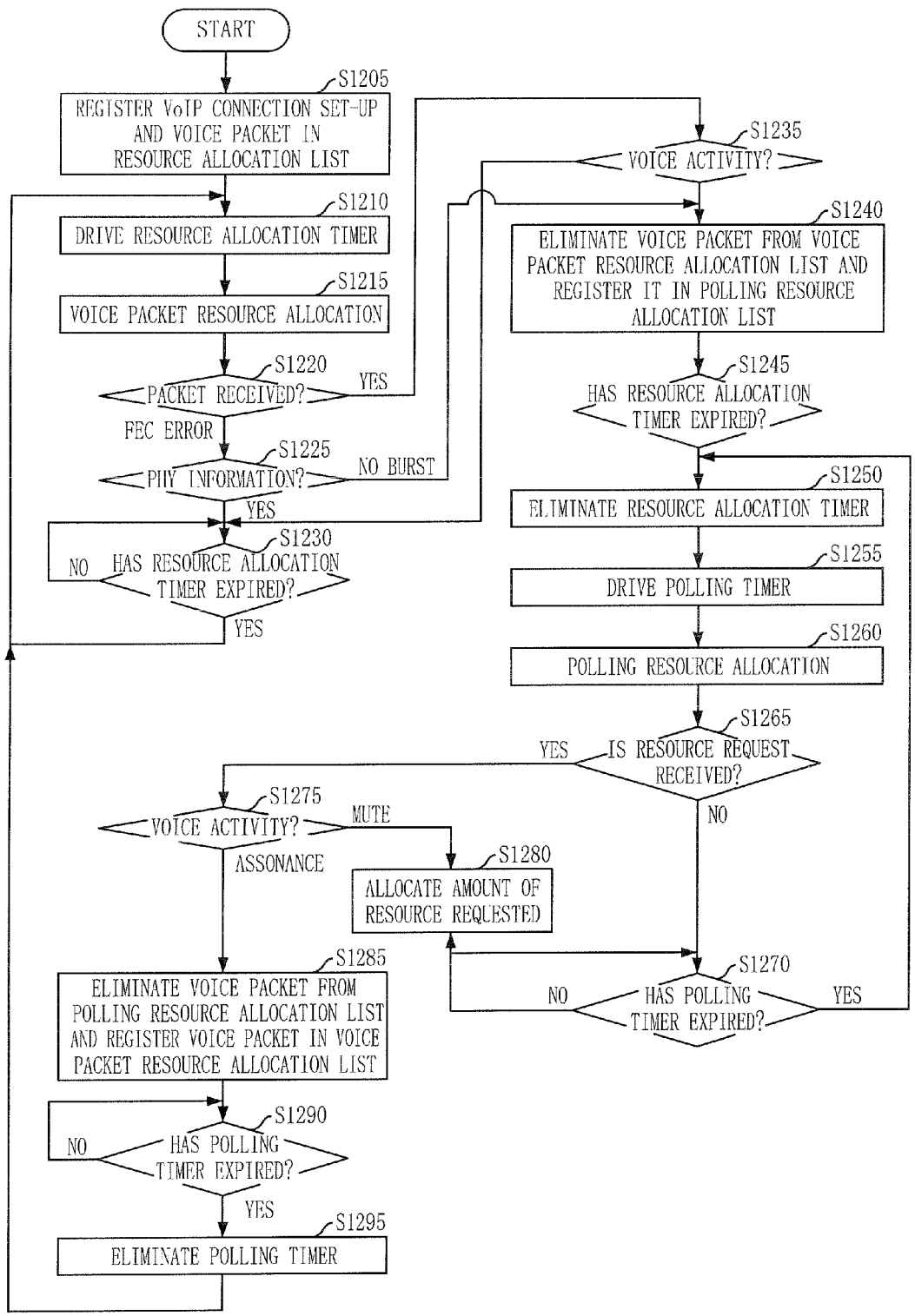
FIG. 15 is a flowchart describing the method for resource allocation of variable bit rate VoIP traffic in accordance with an embodiment of the present invention.

FIG. 15 is a flowchart describing an operation process of the network device in accordance with another embodiment of the present invention, and particularly shows a flow of an example of a method for resource allocation of variable bit rate VoIP traffic in accordance with an embodiment of the present invention.

First, the network device exchanges messages for VoIP call connection set-up with the subscriber device, and at the same time exchanges VoIP codec information containing a resource allocation period, a resource allocation size, a polling period, and an SID packet length, and registers the subscriber device in the resource allocation list when the call connection set-up is finished (S1205).

Thereafter, the network device drives a timer for periodic resource allocation of the subscriber device (S1210), and allocates a resource for transmission of voice packet (S1215). And the network device checks whether a packet is correctly transmitted from the subscriber device through the allocated resource (S1220), and, if not correctly received, checks whether an FEC (Forward Error Correction) error occurs in information provided from a physical layer (S1225). In a result of the checking (S1225), when there occurs an FEC error, the network device remains the subscriber device in the resource allocation list and waits for until the resource allocation timer expires (S1230), and when there occurs no FEC error, that is, when there is in No burst state indicating that no information is transmitted from the physical layer, the process of the network device goes to the step S1240 to eliminate the subscriber device from the resource allocation list and registers it in the polling resource list (S1240).

Meanwhile, in result of the checking in the step S1220, when correctly received, the network device checks whether the voice activity field value within the MAC extended header of a received frame is 2 indicating assonance or 0 indicating mute (S1235).

In a result of the checking in the step S1235, when the voice activity field value indicates assonance, it maintains the resource allocation list as it is and waits for until the resource allocation timer expires (S1230).

In a result of the checking in the step S1235, when the voice activity field value indicates mute, it eliminates the subscriber device from the resource allocation list and registers it in the polling allocation list (S1240).

Next, the network device waits for until the resource allocation timer expires (S1245), and when the resource allocation timer has expired, eliminates it (S1250) and drives a polling timer (S1255) to allocate a polling resource to the subscriber device (S1260). And the network device checks whether the resource allocation message is received through the polling resource allocated to the subscriber device (S1265), and, when the resource allocation message is not correctly received, the process of the network device waits for until the polling timer expires (S1270) and returns to step S1255.

Meanwhile, when the resource allocation message is correctly received through the polling resource allocated to the subscriber device (S1265), the process checks the voice activity field value of the received resource request message (S1275), and when that value indicates the mute state as 1 or 0, the process recognizes it as the resource request for the SID packet and allocates a resource capable of transmitting the SID packet (S1280), and goes to step S1270 to repeatedly perform the polling.

In a result of the checking in the step S1275, when the voice activity value indicates the assonance state as 2, the process recognizes that the subscriber device is transited from the mute state to the assonance state, eliminates the subscriber device from the polling resource allocation list and registers it in the voice packet resource allocation list (S1285), and waits for until the polling timer expires (S1290). Thereafter, when the polling timer has expired, the process eliminates the polling timer (S1295) and returns to step S1210 to restart resource allocation for the voice packet. Here, although not shown in the drawing, the network device, which has recognized that the specific subscriber device is transited from the mute state to the assonance state from the voice activity field value contained in the resource request message, can give an additional resource at the time of initial resource allocation after transition, and is not affected for a next resource allocation although no signal is received through the additionally allocated resource.

Figure 16:
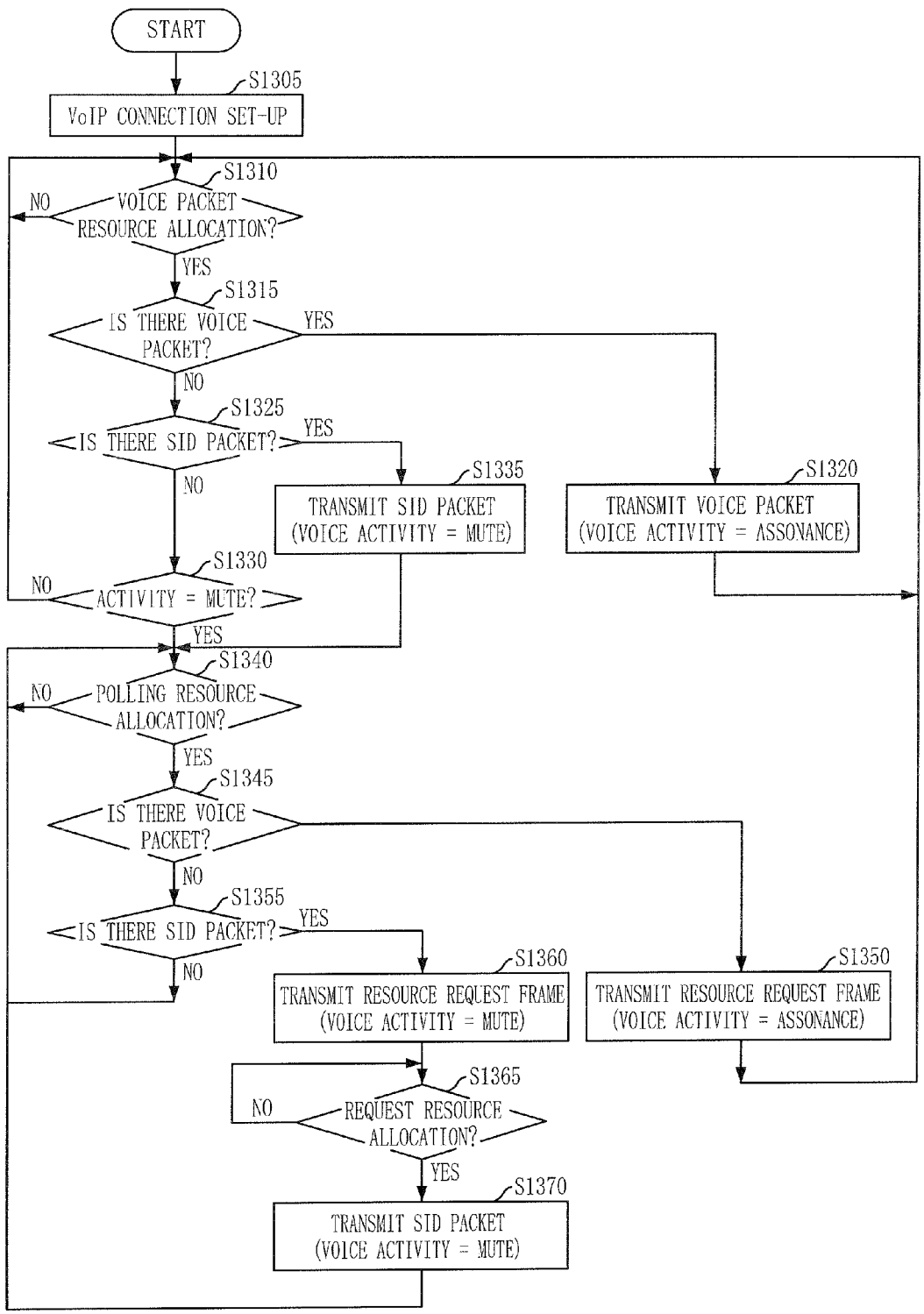
FIG. 16 is a flowchart describing the method for upstream transmission of variable bit rate VoIP traffic in accordance with an embodiment of the present invention.

FIG. 16 is a flowchart describing an operation process of the subscriber device in accordance with the present invention, and particularly shows a flow of an example of a method for upstream transmission of variable bit rate VoIP traffic in accordance with an embodiment of the present invention.

First, the subscriber device exchanges messages for VoIP call connection set-up with the network device, and at the same time exchanges VoIP codec information containing a resource allocation period, a resource allocation size, a polling period, and an SID packet length (S1305). In a result, when the VoIP call connection set-up is completed, the subscriber device waits for resource allocation of the voice packet (S1310), and when the subscriber device recognizes that the resource allocation is made, it checks whether there is a voice packet to be transmitted by using the allocated resource (S1315).

In a result of the checking in the step S1315, when there is a voice packet to be transmitted, the subscriber unit transmits sets the voice activity value to 2 indicating assonance (S1320) and waits for resource allocation of the voice packet (S1310).

In a result of the checking in the step S1315, when there is no voice packet to be transmitted in the transmission queue, the subscriber unit checks whether there is an SID packet (S1325). If there is no SID packet, it checks previous voice activity state when the transmission queue is empty (S1330). If it is assonance, the process of the subscriber unit returns to step S1310 to wait for the resource allocation of voice packet and when it was mute, the process waits for the polling resource allocation (S1340). In general, the codec generating the SID packet necessarily generates the SID packet when transiting from assonance to mute. And when the transmission queue is empty with the resource allocation being made for the voice packet, it can generate the same when the network device additionally allocates one or more voice packet resources when transiting from mute to assonance. In this case, the previous voice activity state is considered in order to prevent unnecessary state change.

Meanwhile, when there is an SID packet in the transmission queue (S1325), the process sets the voice activity value of the SID packet to 0 (mute) and transmits it by using a resource allocated for voice packet (S1335), and goes to step S1340, which becomes the polling state.

Thereafter, the subscriber device, which has recognized that the polling resource was allocated (S1340), checks whether a voice packet was stored in the transmission queue (S1345), and when a voice packet was stored in the transmission queue, the subscriber device transmits the resource request message by using the allocated polling resource and notifies the network device that it was transited from the mute state to the assonance state (S1350). At this time, the voice activity of the resource request message is set to 2 indicating assonance. And then, the process returns to step S1310 to wait for the voice packet resource allocation.

Meanwhile, in a result of the checking in the step S1345, when there is no voice packet in the transmission queue, the process checks whether an SID packet was stored in the transmission queue (S1335). If the SID packet was not stored in the transmission queue, the process returns to step S1340, which becomes the polling state. If the SID packet was stored in the transmission queue, the process transmits the resource request message for the SID packet transmission to the network device (S1360). At this time, the voice activity of the resource request message is set to 1 indicating mute. And then, the subscriber device checks whether the allocation of resource requested is made (S1365), and when the allocation of requested resource is made, the process transmits the SID packet (S1370) and returns to step S1340, which becomes the polling state. At this time, the voice activity value of the SID packet is set to 0 indicating mute.

As described above, the present invention allows a subscriber device side to detect a voice activity of a VoIP speech codec and to notify a network device of it. Thus, the present invention can prevent unnecessary resource allocation due to SID packets intermittently generated in a mute section and more efficiently allocate resources for variable bit rate packets generated in an assonance section.

The method of the present invention as mentioned above may be implemented by a software program that is stored in a computer-readable storage medium such as CD-ROM, RAM, ROM, floppy disk, hard disk, optical magnetic disk, or the like. This procedure may be readily carried out by those skilled in the art; and therefore, details of thereof are omitted here.

While the present invention has been described with respect to the particular embodiments, it will be apparent to those skilled in the art that various changes and modifications may be made without departing from the spirit and scope of the invention as defined in the following claims.

What is claimed is:

1. An apparatus for upstream transmission of variable bit rate Voice over Internet Protocol (VoIP) traffic in a Hybrid Fiber Coaxial (HFC) network, said apparatus comprising:
   a VoIP signal processing unit for digitizing a voice signal generated by a speaker to create a voice packet, detecting a mute section to suppress packet generation, and generating a Service identification (SID) packet in the mute section;
   a storage unit for temporarily storing and queuing the voice packet and the SID packet created by the VoIP signal processing unit and providing information on a size of each of the stored packets;
   a VoIP activity determining unit for determining a voice activity based on the information on the size of each of the stored packets provided by the storage unit; and
   a packet processing unit for including the voice activity transferred from the VoIP activity determining unit in the packets from the storage unit, and transmitting the packets with the included voice activity to a network device to thereby allow the network device to allocate a resource with a suitable size depending on the voice activity;
   wherein the voice activity is one selected from the group consisting of a first value requesting the network device to execute polling without allocating resources, a second value requesting resource allocation of an SID packet length, a third value requesting resource allocation of a voice packet length.

2. The apparatus of claim 1, wherein the VoIP activity determining unit continuously maintains the voice activity at the third value when the voice packet is stored in the storage unit during a voice session, transits the voice activity to the first value when the SID packet is stored during said voice session, and sets the voice activity to the third value when a voice packet is stored during a mute session.

3. The apparatus of claim 2, wherein the packet processing unit
   transmits the SID packet with the voice activity set to the first value, when the SID packet is generated during the voice session, to request the network device to suspend a next resource allocation and perform polling, sends a request, through a polling resource and with the voice activity set to the second value, to the network device to request a resource required for SID packet transmission when SID packets are intermittently generated during the mute session, and transmits, to the network device, the SID packet with the voice activity set to the first value by using allocated resource received in response to the request, to thereby continue the polling.

4. The apparatus of claim 1, wherein, depending on the size of the voice packet, the VoIP activity determining unit further varies a value of the voice activity in a resource request message that requests resource allocation of various voice packet lengths to support a variable bit rate, so that the network device allocates the resource with the suitable size for the voice packet generated in the VoIP signal processing unit in accordance with the voice activity value contained in the resource request message.

5. A network device for resource allocation of variable bit rate VoIP traffic in an HFC network, said device comprising:

a resource allocation unit for allocating a resource for voice packet transmission while driving a timer for periodic resource allocation of a subscriber device when a call connection set-up between the network device and the subscriber device is finished;

a voice activity extracting unit for extracting a voice activity value contained in a current packet transmitted from the subscriber device, wherein said voice activity value is generated by the subscriber device based on a size of the packet; and a control unit for controlling the resource allocation unit to allocate a resource with a suitable size for a packet to be subsequently sent by the subscriber device depending on the voice activity value extracted from the voice activity extracting unit;

wherein the control unit allocates a resource with a suitable size for upstream voice packet transmission when the current packet transmitted from the subscriber device is a voice packet and the voice activity value extracted therefrom indicates a voice session, suspends a next resource allocation and performs polling when the current packet from the subscriber device is an SID packet and the voice activity value extracted therefrom indicates a mute session, when the current packet, received through the polling resource allocated to the subscriber device, is a resource request message and the voice activity value extracted therefrom indicates the mute session, recognizes the current packet as a resource request for a subsequent SID packet, allocates a resource suitable for SID packet transmission, and then performs polling, and when the current packet, received through the polling resource allocated to the subscriber device, is a resource request message and the voice activity value extracted therefrom indicates the voice session, recognizes that the subscriber device is transited from the mute session to the voice session and controls the resource allocation unit to resume the resource allocation for voice packet transmission.

6. The apparatus of claim 5, wherein the control unit recognizes that the subscriber device is transited from the mute session to the voice session based on the voice activity value extracted from the resource request message received through the polling resource allocated to the subscriber device, and the control unit controls the resource allocation unit to resume the resource allocation for voice packet transmission by additionally allocating a resource at the time of initial resource allocation after transition.

7. A method for upstream transmission of variable bit rate Voice over Internet Protocol (VoIP) traffic in a Hybrid Fiber Coaxial (HFC) network, said method comprising the steps of:

a) performing a VoIP call connection procedure by exchanging messages containing VoIP call related parameters between a subscriber device and a network device;

b) at the subscriber device, determining a voice activity based on a size of each of packets stored in a transmission queue of the subscriber unit; and c) at the subscriber device, including the determined voice activity in the packets stored in the transmission queue, and, when the subscriber device gets allocated resource from the network device, transmitting the packets with the included voice activity to the network device, to thereby allow the network device to allocate a resource with a suitable size depending on the voice activity;

wherein the voice activity is one selected from the group consisting of a first value requesting the network device to execute polling without allocating resources, a second value requesting resource allocation of an SID packet length, a third value requesting resource allocation of a voice packet length.

8. The method of claim 7, wherein the step b) includes the steps of:

b1) continuously maintaining the voice activity at the third value when a voice packet is stored in the transmission queue during a voice session;

b2) transiting the voice activity to the first value when a Service identification (SID) packet is stored in the transmission queue during said voice session; and b3) transiting the voice activity to the third value when a voice packet is stored in the transmission queue during a mute session.

9. The method of claim 8, wherein the step c) includes the steps of:

transmitting the SID packet with the voice activity set to the first value, when the SID packet is generated during the voice session, to request the network device to suspend a next resource allocation and perform polling, sending a request, through a polling resource and with the voice activity set to the second value, to the network device to request a resource required for SID packet transmission when SID packets are intermittently generated during the mute session, and transmitting, to the network device, the SID packet along with the voice activity set to the first value during the mute session, by using a resource allocated in response to the request, to thereby continue polling.

10. The method of claim 8, wherein the step c) includes the steps of:

c1) checking whether there is a voice packet to be transmitted in the transmission queue of the subscriber device when the subscriber device gets allocated resource for voice packet transmission from the network device;

c2) when it is checked at c1) that there is a voice packet in the transmission queue, transmitting the voice packet with the voice activity value set to the third value indicating a voice session;

c3) when it is checked at c1) that there is no voice packet in the transmission queue, checking whether there is an SID packet in the transmission queue;

c4) when it is checked at c3) that there is no SID packet in the transmission queue, checking a previous voice activity state, and when the previous voice activity state was a voice session, waiting for a resource allocation for voice packet transmission and when the previous voice activity state was a mute session, waiting for a resource allocation for polling;

c5) when it is checked at c3) that there is an SID packet in the transmission queue, setting the voice activity value of the SID packet to the first value, transmitting the SID packet using the allocated resource for voice packet transmission, and waiting for the resource allocation for polling;

c6) when the subscriber device recognizes that a voice packet is stored in the transmission queue at the time of polling resource allocation, transmitting a resource request message with the voice activity value set to the third value to the network device to notify that the subscriber device has been transited from the mute session to the voice session, and waiting for the resource allocation for voice packet transmission; and c7) when the subscriber device recognizes that an SID packet is stored in the transmission queue at the time of polling resource allocation, transmitting the resource request message with the voice activity value set to the second value to the network device to request a resource allocation for SID packet transmission.

11. A method for resource allocation of variable bit rate VoIP traffic in an HFC network, said method comprising the steps of:

a) executing a call connection procedure by exchanging messages containing VoIP call related parameters between a subscriber device and a network device;

b) at the network device, allocating a resource for voice packet transmission to the subscriber device;

c) extracting a voice activity value contained in a current packet transmitted from the subscriber device, wherein said voice activity value is generated by the subscriber device based on a size of the packet; and d) allocating a resource with a suitable size a packet to be subsequently sent by the subscriber device depending on the extracted voice activity value wherein the step d) includes the steps of:

d1) when the current packet transmitted from the subscriber device is a voice packet and the voice activity value extracted therefrom indicates a voice session, allocating a resource with a suitable size for upstream voice packet transmission;

d2) when the current packet from the subscriber device is an SID packet and the voice activity value extracted therefrom indicates a mute session, suspending a next resource allocation and performing polling;

d3) when the current packet, received through the polling resource allocated to the subscriber device, is a resource request message and the voice activity value extracted therefrom indicates the mute session, recognizing the current packet as a resource request for a subsequent SID packet or, allocating a resource suitable for SID packet transmission, and then performing polling; and d4) when the current packet, received through the polling resource allocated to the subscriber device, is a resource request message and the voice activity value extracted therefrom indicates a voice session, recognizing that the subscriber device has been transited from the mute session to the voice session, and resuming the resource allocation for voice packet transmission.

12. The method of claim 11, wherein the step d2) includes the steps of:

d2-1) checking whether the packet is correctly received through the resource allocated to the subscriber device;

d2-2) when it is checked at d2-1) that the packet is not correctly transmitted from the subscriber device, checking whether was an FEC (Forward Error Correction) error in information provided from a physical layer;

d2-3) when it is checked at d2-2) that there was the FEC error, waiting for expiration of a resource allocation interval while maintaining the subscriber device in a resource allocation list, and when it is checked at d2-2) that there was no FEC error, eliminating the subscriber device from the resource allocation list and registering the subscriber device in a polling resource allocation list;

d2-4) when it is checked at d2-1) that the packet is correctly transmitted from the subscriber device, checking a voice activity value in the packet;

d2-5) when it is checked at d2-4) that the voice activity value indicates a voice session, waiting for expiration of the resource allocation interval while maintaining the subscriber device in the resource allocation list;

d2-6) when it is checked at d2-4) that the voice activity value indicates a mute session, eliminating the subscriber device from the resource allocation list, and registering the subscriber device in the polling resource allocation list; and d2-7) when the resource allocation interval has expired, eliminating the subscriber device from the resource allocation list, driving a polling timer, and allocating a polling resource to the subscriber device.

13. The method of claim 11, wherein when the subscriber device is recognized to have been transited to the voice session from the mute session based on the voice activity value extracted from the resource request message received through the polling resource allocated to the subscriber device, the step d4) allocates a predetermined additional resource at the time of initial resource allocation after transition.

* * * * *